May 18, 1965  J. F. REUTHER ETAL  3,184,642
SEMICONDUCTOR OVERVOLTAGE PROTECTOR FOR
OPEN-CIRCUITED CURRENT TRANSFORMER
Original Filed Aug. 22, 1958
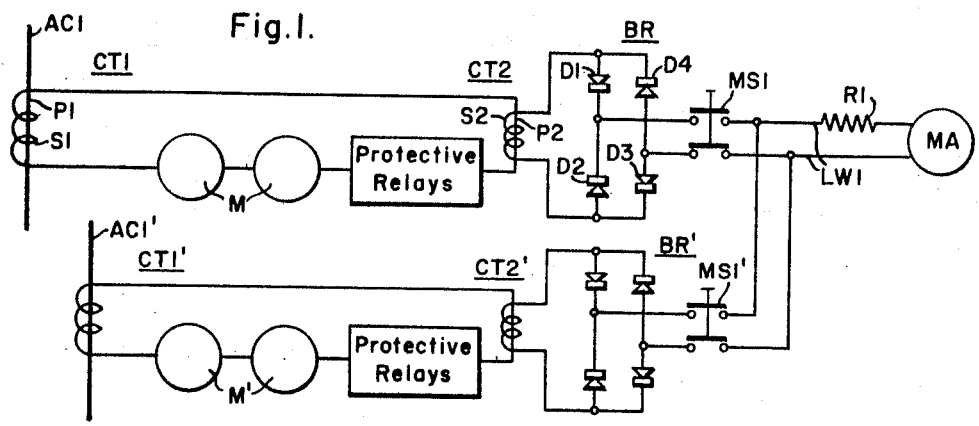
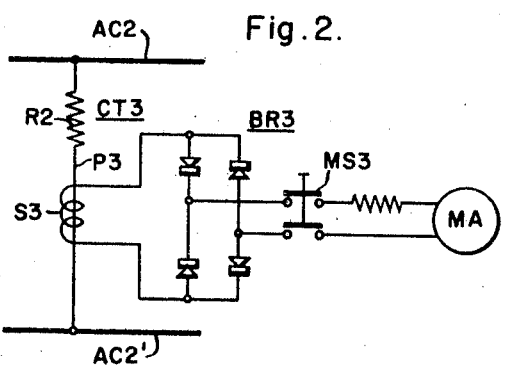
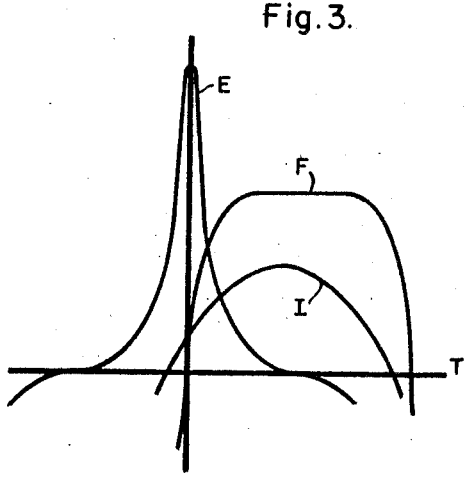
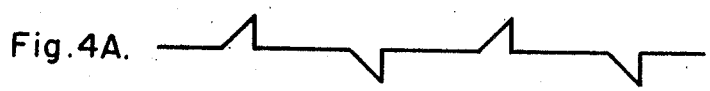
WITNESSES
INVENTORS
Sheldon D. Silliman, John F. Reuther
& William F. Cruess
BY
Ralph N. Swingle
ATTORNEY

3,184,642
SEMICONDUCTOR OVERVOLTAGE PROTECTOR FOR OPEN-CIRCUITED CURRENT TRANSFORMER
John F. Reuther, Penn Hills, William F. Cruess, Monroeville, and Sheldon D. Silliman, Forest Hills, Pa., assignors to Westinghouse Electric Corporation, East Pittsburgh, Pa., a corporation of Pennsylvania
Continuation of application Ser. No. 756,604, Aug. 22, 1958. This application May 12, 1961, Ser. No. 112,158
6 Claims. (Cl. 317—14)

This invention relates to an overvoltage protector for a current transformer operating an open secondary, and has particular relation to the use of junction rectifiers for such purpose.

This application is a continuation of application Serial No. 756,604, filed August 22, 1958, by John F. Reuther et al., now abandoned and assigned to the same assignee as the present invention.

It is an object of this invention to provide in the secondary of a current transformer a means for providing rectification of the secondary current flow when the transformer is connected to energize a meter, and which rectification means changes its character to permit alternating current flow in the secondary when the transformer is disconnected from the meter.

It is another object of this invention to provide in a current transformer secondary, means serving to provide rectified secondary current through a switch means to a meter, which means serves to effect a closed circuit across the transformer secondary to prevent overvoltages each time the switch is opened.

It is a further object of this invention to provide in a telemetering system having a plurality of current transformers arranged for selectively actuating a meter, a static element means associated with each transformer for providing rectified secondary current to the meter when a current reading is called for, and which static element means effects a closed secondary circuit to prevent overvoltages when a current reading is not called for.

It is well-known that if the secondary of a current transformer is opened while the primary is carrying its normal current, the flux in the core will increase to several times its rated value causing extremely high voltage peaks which may damage the transformer insulation and provide a serious shock hazard. This action occurs because a current transformer is connected with its primary in series with the monitored conductor, therefore, when the secondary is open circuited, the current in the primary continues as a line condition independent of the current transformer. Since there is no current flowing in the secondary winding, its normal demagnetizing action or flux cancellation action is eliminated so that the entire primary current flowing becomes magnetizing current and will saturate the core. Since the product of the area of the core and the number of turns for a current transformer is relatively small, this would not produce a seriously high voltage if the voltage wave form was a sine wave; however, the voltage wave so produced when the secondary is open is not a sine wave but a wave having very high peak values sufficient to damage the transformer insulation.

In supervisory control apparatus directed to the telemetering of currents or voltages of a plurality of remote conductors, the control apparatus selectively switches the secondaries of the individual conductor monitoring transformers to a common telemetering transmitter-rectifier device for transmission over a single signal channel to an appropriate meter at the dispatch office. This selective switching of transformer secondaries necessitates the use of protective means to avoid the damaging overvoltages occurring on open circuit operation of the transformer secondary as discussed above.

Heretofore, make-before break contacts have been used to short the secondary before it is disconnected from the channel, but the possible failure of the contacts to maintain a burden on the secondary is a definite limitation. It has also been proposed to connect film gap devices across the transformer secondaries to break down in response to an overvoltage when the secondary is opened to thus maintain secondary current flow, but these devices are inconvenient since they must be replaced after one voltage breakdown.

According to this invention, the secondary of each auxiliary current transformer is connected across a full-wave bridge rectifier comprised of a plurality of semiconductor rectifiers, preferably of the silicon junction type, each semiconductor rectifier having a breakdown voltage within a predetermined range of values. The semiconductor rectifiers are preselected for a breakdown voltage which is greater than the normal telemetering output voltage of the transformer to permit normal rectification of the secondary current during a telemetering operation, but which breakdown voltage is at the same time less than the transformer insulation damaging voltage so that when the secondary is deliberately open circuited to terminate a telemetering operation, the rectifiers will break down thus providing bi-directional current flow in the current transformer secondary for limiting the peak voltage to a tolerable value. This structure eliminates the necessity for any protective means such as make-before break contacts, film gaps, or any other means in addition to or external of the basic parts which perform the transformer-rectifier function.

In this application, breakdown pertains to the known phenomenon occurring in certain types of rectifiers, such as the silicon junction type, wherein increasing the reverse voltage across the rectifier to a certain critical region causes the normally negligible reverse current through the rectifier to increase very sharply with little change in applied voltage. It is to be understood that breakdown does not imply a destructive phenomenon but pertains to a reverse conducting operation that is repeatable each time the critical voltage is reached. This breakdown voltage is sometimes referred to as the Zener voltage.

The invention itself, both as to structure and operation, together with additional objects and advantages thereof, will best be understood from the following description of specific embodiments when read in conjunction with the accompanying drawing, in which:

FIGURE 1 is a diagrammatic view of a plurality of standard current transformers and related auxiliary current transformer-rectifier devices arranged for selective switching to a common meter in accordance with this invention;

FIG. 2 is a diagrammatic view of an auxiliary current transformer adapted for use as a potential transformer and coupled through switching means to a meter in accordance with this invention;

FIG. 3 is a curve diagram illustrating the general relationship between primary current, flux, and secondary voltage when the secondary of a current transformer is open while the primary is carrying normal current; and FIGS. 4A and 4B are curve diagrams illustrating the relationship between the current flow in the transformer secondary and the voltage across a semi-conductor rectifier when the secondary is open.

The curves of FIG. 3 illustrate the general relationship between the primary current flow and flux change which produces the dangerously high peak voltages in the open secondary operation of current transformers in general, as previously described. The wave shape of the primary current I is determined by the load on the primary network and not by the current transformer. Assuming that the primary current I is sinusoidal, the opening of the secondary produces a flux curve F having steep sides and a relatively flat top, thus indicating core saturation early in the half cycle. Inasmuch as the induced voltage is proportional to the rate of flux change, high voltage peaks are produced on the resulting voltage curve E as indicated.

In FIG. 1 of the drawing there is disclosed a bus line AC1 carrying an alternating current to be monitored by current transformer-rectifier means now to be described. A standard current transformer CT1 is connected with its primary winding P1 in series relationship with the alternating current bus line AC1. The secondary winding S1 of current transformer CT1 is connected in series circuit relationship with various meters M, such as an ammeter and other meters of conventional type, a protective relay or a group of protective relays which may operate in known manner conventional protective devices for the current transformer, and the primary winding P2 of an auxiliary current transformer CT2 having a secondary winding S2.

The auxiliary current transformer CT2 steps down the main current telemetering current of the secondary of transformer CT1 to a level suitable for telemetering purposes. A full-wave bridge rectifier BR, comprised of four rectifiers D1 through D4 is connected across the secondary winding S2 for providing a direct current output to a signal carrier means comprised of line wires LW1. The line wires LW1 are connected to a milliammeter. Resistor R1 represents the total resistance of the line wires LW1. A momentary switch MS1 is arranged to connect the output of bridge rectifier BR to the line wires LW1. However, it is to be understood that a relay or other remotely controlled switching means may be readily substituted for the switch MS1 to provide switching by supervisory control means, if desired.

The rectifiers D1 through D4 are preferably of the known silicon junction type. Each rectifier has a predetermined breakdown voltage, which voltage is greater than the output voltage of the auxiliary current transformer CT2 so as to effectively block reverse current and thus provide rectification under normal conditions occurring during a telemetering operation, and which voltage is less than the high peak voltage which may damage the transformer insulation. For example, in FIG. 1 the standard current transformer CT1 may have an output of five amperes A.C., and the auxiliary current transformer CT2 and the rectifiers may change the five amperes A.C. to three milliamperes D.C. for transmission to a milliammeter through line wires LW1 having a resistance R1 of approximately 10,000 ohms maximum. The output telemetering voltage in this instance will be 30 volts D.C. thus providing the auxiliary transformer CT2 with a small burden of .09 volt ampere. In this instance, the rectifiers should have a breakdown voltage greater than 30 volts but less than the dangerous voltage range beginning at approximately 600 volts. The auxiliary current transformer is designed to saturate at a value of current slightly above full scale value; therefore, if the breakdown voltage is relatively high, about 200 volts in the example given, the auxiliary current transformer can maintain the breakdown voltage during only a small portion of the half cycle.

FIGS. 4A and 4B illustrate the theoretical relationship between the auxiliary current transformer secondary current and the voltage across the silicon diodes when the switch MS1 is open. FIG. 4A illustrates the current flow wherein the peaks indicate saturation early in the half cycle. FIG. 4B illustrates the voltage across a diode wherein the flat tops represent the breakdown voltage. The power dissipated in the silicon rectifier is relatively small when averaged over a cycle, therefore, low cost silicon rectifiers can be utilized in the construction of the full-wave bridge rectifiers. It is seen that the breakdown voltage may vary considerably within the prescribed limits and still effectively protect against overvoltage; however, the greater the breakdown voltage, the lesser is the power loss. The maximum limit of the breakdown voltage is governed primarily by the ability of the transformer insulation to withstand the heat produced by the greatly increased core losses resulting from saturation during an open circuit condition.

Also disclosed in FIG. 1 is a second standard current transformer CT1' identical to the current transformer CT1, a second auxiliary transformer CT2' and bridge rectifier BR' identical to auxiliary current transformer CT2 and bridge rectifier BR, respectively, and a second alternating current conductor. The bridge rectifier BR' is connected to line wires LW1 through momentary switch MS1'. The switches MS1 and MS1' thus provide for selectively connecting each of the current transformers CT2 and CT2' to the line wires LW1 and the milliammeter.

In describing the operation of the apparatus of FIG. 1, it will be asumed that switch MS1 is closed and switch MS1' is open. The standard current transformer CT1 steps down the current flowing in power line AC1 and provides a current flow through the step-down auxiliary transformer CT2 in a manner well known in the art. The bridge rectifier BR under these conditions operates in conventional fashion to rectify the alternating current flowing through the secondary S2 of auxiliary transformer CT2 to thus provide a direct current flow through the contacts of MS1 and through line wires LW1 to actuate the remotely positioned milliammeter. When it is desired to terminate the telemetering operation, switch MS1 is opened to disconnect the bridge rectifier BR from the line wires LW1, which disconnection places the secondary S2 of auxiliary current transformer in an open condition. Current ceases to flow in the secondary S2 while the current through the primary P2 continues unaffected to serve as magnetizing current saturating the core in the manner hereinbefore described. The voltage across the secondary then rises above the normal output voltage toward a dangerously high peak voltage so that the silicon diodes reach their breakdown point to allow current to flow through them in the reverse direction, thus preventing the voltage across the secondary from reaching dangerously high peaks.

The full-wave rectifier has two possible breakdown paths each half cycle. For example, when the upper end of secondary S2 is positive, either diode D2 or diode D4 will break down, depending on which has the lower breakdown voltage. Assuming that diode D2 has a lower breakdown voltage, it will operate as a switch to complete a secondary circuit including secondary winding S2, diode D1 carrying current in the forward direction, and diode D2 carrying current in the reverse direction. When the lower end of secondary S2 is positive, either diode D1 or diode D3 will break down, depending on which of these two has the lower breakdown voltage.

While current transformer CT2 is telemetering information, the diodes of bridge rectifier BR' of current transformer CT2' are passing reverse currents to effectively close the secondary in the same manner as described with respect to the operation of the diodes of bridge rectifier BR during open circuit operation of secondary S2.

The auxiliary current transformer CT2 of FIG. 1 may be readily adapted for voltage telemetering by providing a primary current proportional to the voltage to be measured. Such an adaptation is disclosed in FIG. 2 wherein the primary P3 and resistor R2 of current transformer CT3 are connected between conductors AC2 and AC2', which conductors may represent alternating current carrying leads of the secondary of a standard potential transformer (not shown). The secondary S3 is connected across a bridge rectifier BR3 identical in structure to the hereinbefore described bridge rectifier BR of FIG. 1. A switch MS3 connects the bridge rectifier to line wires LW3 and a milliammeter.

The operation of the apparatus of FIG. 2 is the same as that of FIG. 1 as hereinbefore described. A plurality of voltage measuring devices of the type disclosed in FIG. 2 may be connected to actuate a common milliammeter in the same fashion as the current measuring devices are connected to a common milliammeter in FIG. 1, but the milliammeter may have its scale calibrated in volts.

The difference in structure between the current transformer CT2 and bridge rectifier of FIG. 1 and the current transformer CT3 and accompanying bridge rectifier of FIG. 2 resides in the different number of turns in the respective primary windings to compensate for the difference in current flow in the standard current transformer secondary S1 of FIG. 1 as compared with the current flow in the standard potential transformer secondary leads AC2, AC2' of FIG. 2. Accordingly, if desired, each current transformer may be provided with a current primary and a voltage primary to provide interchangeability for telemetering either current or voltage.

The invention as hereinbefore described has utility not only in switching circuits where the secondaries of transformers are purposely open-circuited, but also in circuits intended to be continuously closed so that the diodes may provide transformer protection in the event the closed circuits including the transformer secondaries are accidentally opened for any number of reasons commonly causing electrical outage.

Since certain of the above-described features may be changed without departing from the spirit and scope of this invention, it is intended that all the matter contained in the above description and shown in the accompanying drawings should be considered as illustrative only.

We claim as our invention:

1. In combination; a current transformer having a primary for responding to current variations in a monitored conductor and having a secondary; a full-wave bridge rectifier comprised of a plurality of semiconductor diodes and having the input connected across the secondary and having an output; means including a switch for connecting the output to actuate a meter; at least two of said diodes having a predetermined breakdown voltage greater than the normal output voltage of the transformer and less than the predetermined transformer damaging overvoltage for permitting current flow in said secondary in both directions to prevent the occurrence of transformer damaging overvoltages when said switch is open.

2. In combination; a plurality of current transformers each having a primary for responding to current variations in one of a plurality of conductors and each having a secondary; a plurality of full wave bridge type rectifier means including semiconductor diodes and each having an input connected across the secondary of one of said current transformers and each having an output; means including a switch means individual to each full wave rectifier means for connecting the outputs to a single meter; said semiconductor diodes each having a definite breakdown voltage greater than the transformer output voltage and less than the transformer damaging overvoltage for permitting alternating current flow in both directions in the corresponding secondary when the corresponding switch is open.

3. In combination; a current transformer having a primary for continuously responding to current variations in a monitored conductor and having a secondary, full wave bridge type rectifier means having an input connected across the secondary and having an output means including signal carrier means connected to respond to the output; said full wave rectifier means including semiconductor rectifier means having a breakdown voltage greater than the normal current transformer output voltage and less than a predetermined minimum damaging overvoltage to permit current flow in both directions through said secondary when the voltage thereacross exceeds said breakdown voltage.

4. In combination; a current transformer having a primary and a secondary; a full-wave bridge rectifier having an input connected across the secondary and having an output for connection in a circuit; said full wave bridge rectifier including a plurality of rectifiers, at least two of said rectifiers each comprising a semiconductor device having a breakdown voltage greater than the normal transformer output voltage and less than a predetermined transformer damaging overvoltage to effect full-wave shunting of the secondary and to permit current flow in both directions in said secondary when said circuit is open.

5. In combination: a current transformer having a primary and a secondary; a full-wave bridge rectifier having two pairs of rectifiers, each of said pairs connected across said secondary; one of said pairs being series connected in anode to anode relationship, with the connection between anodes comprising an output terminal of the bridge rectifier for connection in a circuit; the other of said two pairs of rectifiers being series connected in cathode to cathode relationship, with the connection between cathodes comprising another output terminal of the bridge rectifier for connection in said circuit; at least one rectifier of each of said two pairs of rectifiers comprising a semiconductor device having a breakdown voltage greater than the predetermined normal output voltage of the current transformer and less than a predetermined transformer damaging over-voltage to effect full-wave shunting of the secondary and to permit current flow in both directions in said secondary when said circuit is open.

6. In combination: a current transformer having a primary and a secondary; a full-wave bridge rectifier having two pairs of rectifiers, each of said pairs connected across said secondary; one of said pairs being series connected in anode to anode relationship, with the connection between anodes comprising an output terminal of the bridge rectifier for connection in a circuit; the other of said two pairs of rectifiers being series connected in cathode to cathode relationship, with the connection between cathodes comprising another output terminal of the bridge rectifier for connection in said circuit; both rectifiers of at least one pair of said two pairs of rectifiers comprising a semiconductor device having a breakdown voltage greater than the predetermined normal output voltage of the transformer and less than a predetermined transformer damaging overvoltage to effect full-wave shunting of the secondary and to permit current flow in said secondary in both directions when said circuit is open.

References Cited by the Examiner
UNITED STATES PATENTS 2,854,651   9/58   Kircher _____ 324—119
2,903,636   9/59   Guyton _____ 321—2

SAMUEL BERNSTEIN, *Primary Examiner.*